United States Patent [19]

Kita

[11] Patent Number: 4,696,380
[45] Date of Patent: Sep. 29, 1987

[54] DECELERATION CONTROL SYSTEM FOR AUTOMOBILES

[75] Inventor: Yasuo Kita, Kyoto, Japan

[73] Assignee: Shimadzu Corporation, Kyoto, Japan

[21] Appl. No.: 792,299

[22] Filed: Oct. 28, 1985

[30] Foreign Application Priority Data

Oct. 31, 1984 [JP] Japan .................. 59-230928

[51] Int. Cl.⁴ ........................................ B60K 41/26
[52] U.S. Cl. ................................ 192/4 A; 192/4 B
[58] Field of Search ............. 192/4 A, 3 M, 4 B; 74/846

[56] References Cited

U.S. PATENT DOCUMENTS

| | | | |
|---|---|---|---|
| 3,202,012 | 8/1965 | Jania | 74/846 |
| 3,290,958 | 12/1966 | Henry-Biabaud | 74/846 |
| 3,298,174 | 1/1967 | Stoyke et al. | 192/4 B |
| 3,339,363 | 9/1967 | Quayle | 192/4 B |
| 3,628,642 | 12/1971 | Ravenel | 192/4 A X |
| 4,039,061 | 8/1977 | Pruvot et al. | 192/4 A |

FOREIGN PATENT DOCUMENTS

| | | | |
|---|---|---|---|
| 69922 | 1/1983 | European Pat. Off. | 192/4 A |
| 2712327 | 10/1977 | Fed. Rep. of Germany | 192/4 A |

*Primary Examiner*—Rodney H. Bonck
*Attorney, Agent, or Firm*—Franklin D. Wolffe; Morris Fidelman

[57] ABSTRACT

In an automobile provided with an engine, drive wheels, a braking system including a brake pedal and wheel brakes and a continuously variable transmission interposed between the engine and the drive wheels, a deceleration control system comprising an engine speed detector for detecting the rotational speed of the engine, an engine brake controller for producing a signal corresponding to the amount of operation on the brake pedal by a driver so as to apply the signal to an actuating terminal for controlling the reduction ratio of the transmission thereby to change said reduction ratio, and a wheel brake controller for operating the wheel brakes, when the engine speed detected by the engine speed detector has reached a predetermined level, so that the engine speed will not exceed the predetermined level.

13 Claims, 8 Drawing Figures

DECELERATION CONTROL SYSTEM FOR AUTOMOBILES

BACKGROUND OF THE INVENTION

This invention relates to a deceleration control system suitable for use in automobiles provided with a continuously variable transmission commonly referred to as a CVT.

With the recent marked development of hydraulic pump/motors having high efficiency, it has become possible to greatly improve the performance of a hydrostatic transmission commonly referred to as an HST or a hydromechanical transmission commonly referred to as an HMT, which both comprise a combination of hydraulic pump/motors. Now the time is becoming ripe for application of these continuously variable transmissions to automobiles which require a transmission having a high performance characteristic.

In an automobile which employs such a continuously variable transmission, in principle the clutch should not be kept off while the automobile is running, and the transmission must have such a characteristic that when the accelerator pedal is released, the automobile is allowed to run by inertia as smoothly as if the clutch was off. When the brake pedal is operated, however, smooth and rapid deceleration should advantageously be effected. Since frequent use of the wheel brake is likely to cause the brake shoe to be heated and/or worn, it is advisable to make effective use of engine brake for deceleration.

Conventional automobiles employing a continuously variable transmission such as mentioned above are provided with a wheel braking system including a brake pedal which is operated independently of the operation of the system for controlling the reduction ratio of the transmission. This makes it impossible to control engine brake by the operation of stepping on the brake pedal and consequently to obtain the previously mentioned driving characteristics.

Accordingly, the primary object of the invention is to solve without fail and with a comparatively simple system the above mentioned problem that it is difficult to effect deceleration by making effective use of not only the wheel brakes but also engine brake.

The invention will be described with reference to the accompanying drawings.

SUMMARY OF THE INVENTION

Figure 1:
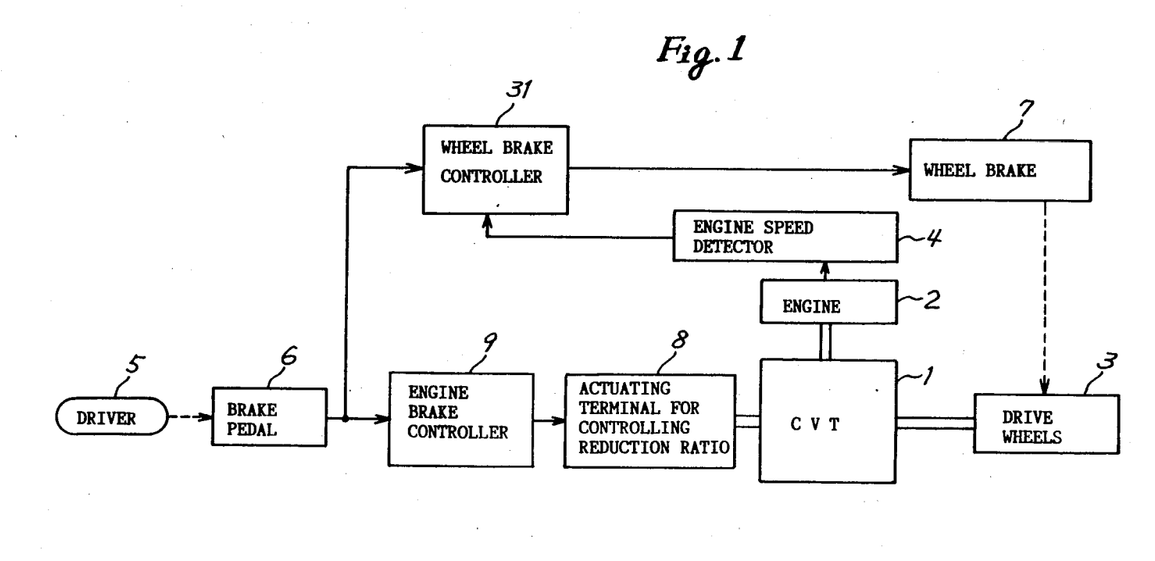
FIG. 1 is a schematic block diagram of one embodiment of the invention.
Figure 2:
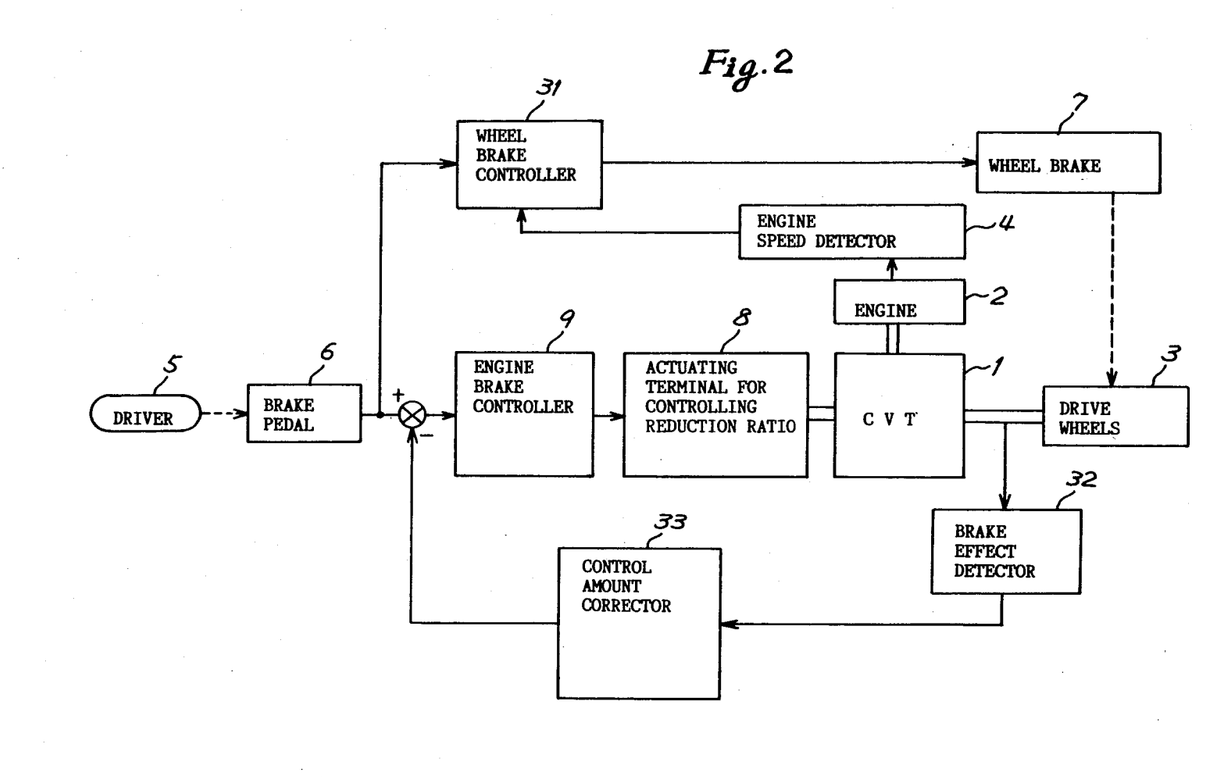
FIG. 2 is a schematic block diagram of a second embodiment of the invention.
Figure 3:
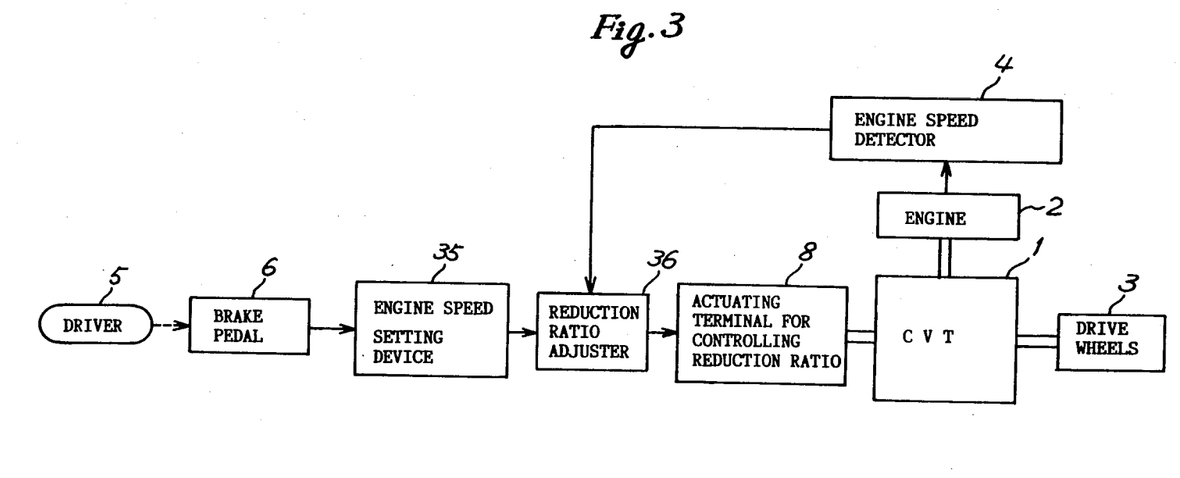
FIG. 3 is a schematic block diagram of a third embodiment of the invention.

According to the invention there is provided a deceleration control system which is applied to an automobile equipped with an engine 2, drive wheels 3, a continuously variable transmission 1 interposed between the engine 2 and the drive wheels 3, and a braking system including a brake pedal 6 and wheel brakes 7, as schematically shown in FIGS. 1 to 3. An actuating terminal 8 is provided for controlling the reduction ratio of the transmission, which can be changed continuously by applying a signal to the actuating terminal 8.

In one embodiment of the invention as schematically shown in FIG. 1, the deceleration control system comprises an engine speed detector 4 for detecting the rotational speed of the engine 2, an engine brake controller 9 for producing a signal corresponding to the amount of operation of the brake pedal that has been stepped on by a driver 5 and applying the signal to the actuating terminal 8 thereby to increase the reduction ratio of the transmission, and a wheel brake controller 31 for operating the wheel brakes 7 in such a manner that if the engine speed detected by the engine speed detector 4 has reached a predetermined level, the engine speed will not exceed the predetermined level.

When a driver 5 releases the accelerator pedal and steps on the brake pedal 6, the engine brake controller 9 operates to control the reduction ratio of the transmission 1 so as to effect engine brake. If the engine speed has reached the preset level, the wheel brake controller 31 operates to cause the wheel brakes 7 to cooperate with the engine brake to effect deceleration so that the engine speed will not exceed the preset value.

In another embodiment of the invention as schematically shown in FIG. 2, in addition to the above-mentioned component parts of the first embodiment the deceleration control system further comprises a brake effect detector 32 for detecting the countertorque the drive wheels 3 exert on the transmission and a control amount corrector 33 for correcting the signal to be applied to the actuating terminal 8 in such a manner that if the torque value detected by the detector 32 has exceeded a predetermined allowable maximum torque value, the reduction ratio is reduced so as to offset the excessive amount. The brake effect detector may be one for detecting the locked condition of the wheels or tires.

The same operations as in the first embodiment are performed in the second embodiment of the invention. Additionally, the control system of the second embodiment operates in the following manner. If the brake pedal 6 is operated in a lower speed range in which the reduction ratio is relatively high, engine brake is likely to act so much so that the tires become locked. In the second embodiment of the invention, however, if the countertorque the drive wheels 3 exert on the transmission has exceeded a predetermined allowable maximum value or if the wheels are locked, the control amount corrector 33 operates to correct the control signal to be applied to the actuating terminal 8 so as to reduce the reduction ratio and offset the excessive amount of countertorque or dissolve the locked condition. Thus, the system of the invention can eliminate the trouble that excessive engine brake is effected.

In a third embodiment of the invention as schematically shown in FIG. 3, the control system comprises, instead of the engine brake controller 9 in the previous embodiments, an engine speed setting device 35 for determining the engine speed for engine brake corresponding to the amount of operation on the brake pedal when the pedal has been stepped on, and a reduction ratio adjuster 36 for adjusting the reduction ratio of the transmission so that the engine speed detected by the engine speed detector 4 approaches or conforms to the above-mentioned engine speed for engine brake.

In the third embodiment of the invention, an engine speed for effecting engine brake is determined in accordance with the amount of operation of stepping on the brake pedal 6, and the reduction ratio adjuster 36 adjusts the reduction ratio of the transmission so that the actual engine speed reaches the determined engine speed for engine brake. Thus, it is possible to make effective use of engine brake, with the amount of operation of stepping on the brake pedal being correlated with the effect of the engine brake.

DESCRIPTION OF THE PREFERRED EMBODIMENTS

Figure 5:
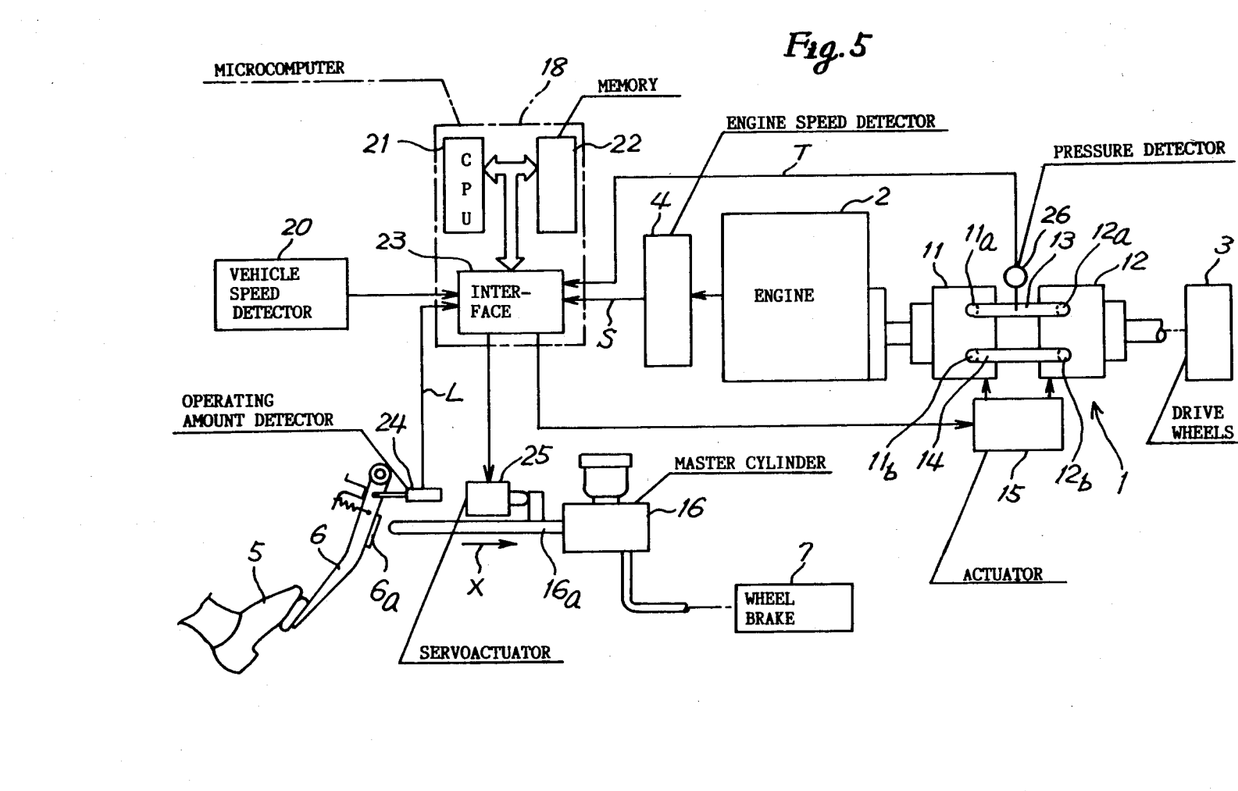
FIG. 5 is a schematic diagram showing in detail the embodiment of FIG. 2.

Referring to FIG. 5, there is shown a diagram of the deceleration control system as applied to an automobile having a continuously variable transmission 1, the reduction ratio of which can be changed continuously in accordance with an operating signal applied to the actuating terminal for controlling the reduction ratio of the transmission, which is interposed between an engine 2 and drive wheels shown as a single block 3.

The transmission 1 may be of a hydrostatic type comprising a combination of a first hydraulic pump/motor 11 of a variable displacement type operatively connected to the output shaft of the engine 2 and a second hydraulic pump/motor 12 of a variable displacement type connected to the driving wheels 3, with a pair of oil pipes 13 and 14 connecting the outlet/inlet ports 11a and 11b of the hydraulic pump/motor 11 to the inlet/outlet ports 12a and 12b of the other hydraulic pump/motor 12, respectively.

The hydraulic pump/motors 11 and 12 may be of the radial piston type the displacement of which can be steplessly or continuously changed by changing the eccentricity of a pintle not shown but included therein.

Figure 4:
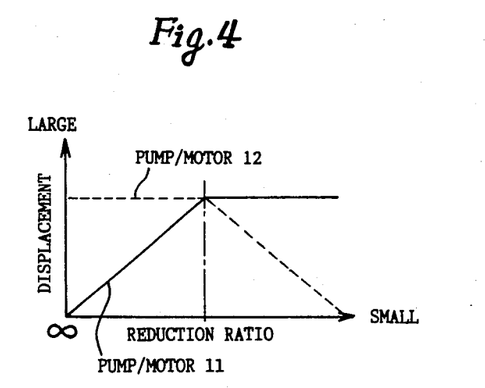
FIG. 4 is a graph for explaining the operation of the continuously variable transmission.

An actuator 15 such as a stepping motor is provided for adjusting the eccentricity of the pintle of the hydraulic pump/motors 11 and 12 thereby to control the displacements thereof. FIG. 4 shows a manner in which the displacements of the hydaulic pump/motors 11 and 12 are changed. As shown, in order to decrease the reduction ratio from infinity, the displacement of the pump/motor 12 is fixed at the maximum value and that of the other pump/motor 11 is increased until the maximum value of the pump/motor 11 is reached, whereupon the displacement of the pump/motor 11 is fixed at the maximum displacement and the displacement of the other pump/motor 12 is reduced. In this embodiment the actuator 15 corresponds to the previously mentioned actuating terminal 8 for controlling the reduction ratio.

This automobile is also provided with wheel brakes 7 for braking the previously mentioned drive wheels 3 and the other wheels not shown. The brakes may be of a conventional hydraulic pressure type so designed as to be operated by the oil pressure generated by a master cylinder 16 upon axial movement of an piston rod 16a in the direction indicated by an arrow X.

The deceleration control system comprises an engine speed detector 4 for detecting the speed of rotation of the engine 2 and a microcomputer 18 which functions as both an engine brake controller and a wheel brake controller.

The microcomputer 18 comprises a central processing unit (CPU) 21, a memory 22 and an interface 23. The microcomputer 18 receives through the interface 23 signals from the engine speed detector 4, a vehicle speed detector 20 and an operating amount detector 24 such as a potentiometer for detecting the amount L of operation on the brake pedal 6. In response to the above-mentioned input signals, the microcomputer 18 produces through the interface 23 a first command signal to increase or decrease the reduction ratio of the transmission so as to be applied to the previously mentioned actuator 15 for controlling the displacement of the pump/motors of the transmission, and a second command signal to put on the brake so as to be applied to a servoactuator 25 for actuating the master cylinder 16.

The operating rod 16a of the master cylinder 16 has its outer end disposed adjacent the brake pedal 6 so that when the brake pedal is depressed beyond a predetermined range of normal use of the brake, a projection 6a on the pedal 6 hits on and moves the operating rod 16a in the direction X. This is a safety measure against situations such as disorder of the servoactuator 25.

The microcomputer 18 also receives through the interface 23 the direction signal from a pressure detector 26 which functions as a brake torque sensor. In response to this input signal the microcomputer 18 functions also as a control amount corrector for correcting the above-mentioned command signal to be applied to the displacement adjusting actuator 15 in such a manner that if the torque T detected by the pressure detector 26 has exceeded a predetermined allowable maximum value Tmax, the reduction ratio of the transmission 1 is reduced thereby to offset the excessive amount of torque. The pressure detector 26 detects the pressure of the working oil in that side of the hydraulic circuit in the transmission whose pressure becomes higher when engine brake is effected and transforms the magnitude of the pressure to a corresponding electrical signal.

Figure 7:
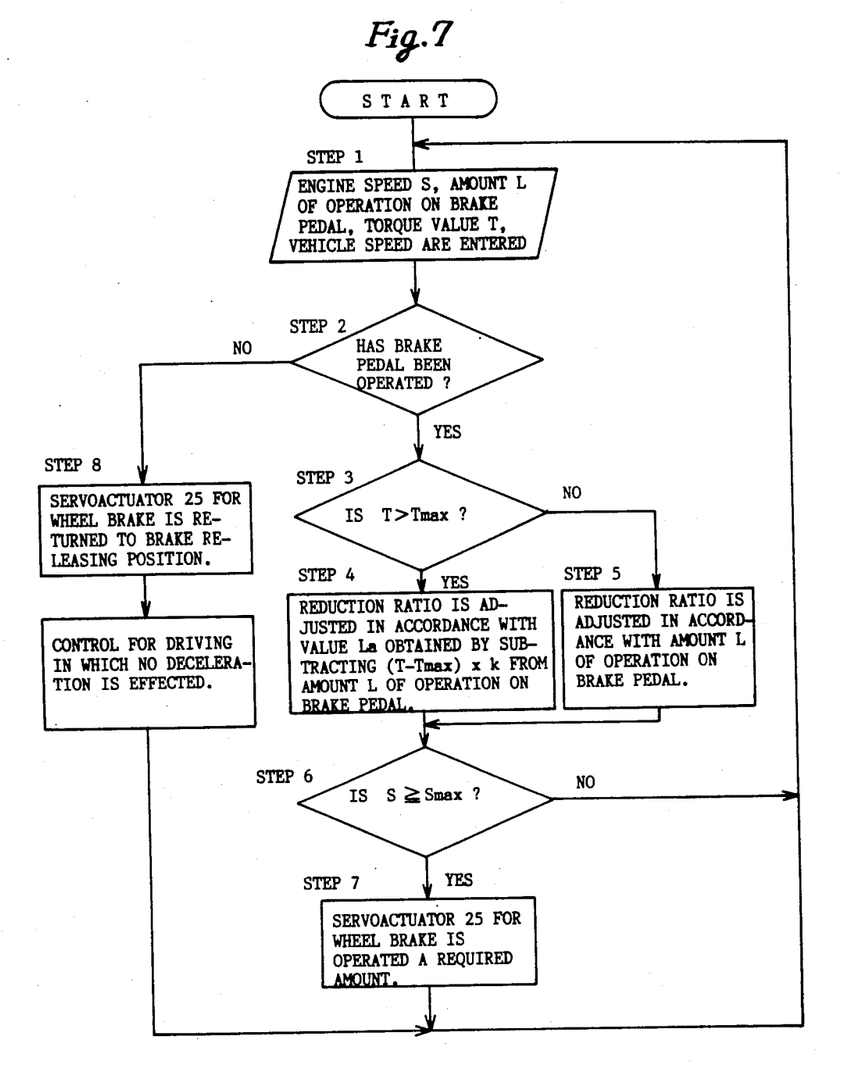
FIG. 7 is a flow chart showing the sequence of operations conducted in the system of FIG. 5.

FIG. 7 is a flow chart showing the sequence of operations of that portion of the microcomputer which functions as the engine brake controller 9, the wheel brake controller 31 and the control amount corrector 33.

First, at step 1 the microcomputer 18 receives the signal corresponding to the engine speed S from the engine speed detector 4, the signal corresponding to the vehicle speed from the vehicle speed detector 20, the signal corresponding to the amount L of stepping operation on the brake pedal from the operating amount detector 24, and the signal corresponding to the torque value T indicating the effect of the engine brake from the torque detector 26. At step 2 it is checked whether or not the brake pedal 6 has been stepped on, and when the pedal 6 has been operated, step 3 is taken, where it is checked whether or not the torque value T detected by the torque detector 26 has exceeded the allowable maximum value Tmax. If the detected torque value T has exceeded the maximum value Tmax, step 4 is taken. Otherwise, step 5 is taken.

At step 4, $(T-Tmax) \times k$ is subtracted from the amount L of operation on the brake pedal 6 as detected by the detector 24 so as to obtain a corrected amount La of operation. Then a reduction ratio of the transmission 1 corresponding to the vehicle speed and the corrected amount La of operation is selected from the data previously stored in the memory 22, and a corresponding command signal is applied to the actuator 15 so that the selected reduction ratio is attained. In (T−Tmax)×k the symbol k expresses a constant.

At step 5, a reduction ratio corresponding both to the amount L of operation on the brake pedal 6 as detected by the detector 24 and the vehicle speed is selected from the data in the memory 22, and a corresponding command signal is applied to the actuator 15 so as to achieve the selected reduction ratio.

Next, at step 6 it is decided whether or not the engine speed S detected by the engine speed detector 4 is below a predetermined maximum value Smax (for example, 2500 rpm). If it has been decided that S<Smax, the process is returned to step 1. If S≧Smax, step 7 is taken, where the servoactuator 25 is operated so as to make the wheel brakes cooperate with the engine brake so that the enine speed S is reduced to the preset value Smax, and when the value Smax is reached, the process is returned to step 1.

At step 2 if it is decided that the brake pedal 6 has not been operated, step 8 is taken, where the servoactuator 25 is at a position for releasing the brake, and the controlling operation for driving in which no deceleration occurs is performed in the following manner.

If an accelerator pedal not shown is being stepped on, the microcomputer determines the driving condition on the basis of the input information concerning the amount of operation on the accelerator pedal and the vehicle speed, selects the reduction ratio most suitable for the driving condition from those reduction ratios previously stored in the memory in accordance with the various patterns of driving (depending on which of fuel expense and drivability importance is attached to), and gives to the actuator 15 a signal to attain the selected reduction ratio.

If both the accelerator pedal and the brake pedal 6 have been released, the reduction ratio is controlled so as to restore the engine speed to the idling speed of rotation. Since the present invention is not concerned with the control operation for driving in which no deceleration occurs, no further detailed explanation will be given.

The operations shown in the flow chart are repeated while the automobile is running.

The following table shows the different modes of driving that can be effected by the control system of the invention.

|  | Acc. | Brake | Vehicle speed | Engine speed |
| --- | --- | --- | --- | --- |
| Acceleration | O | — | ↗ | ↗ |
| Running by traction torque | O | — | → | →e.g.2000 rpm |
| Running by inertia | — | — | → | ↘e.g.700 rpm |
| Deceleration | — | E.B. | ↘ | ↘<2500 rpm |
| Deceleration at high speed | — | E.B. W.B. | ↘ | →2500 rpm |

In the above table "Acc." stands for "accelerator", "E.B." stands for engine brake operating, and "W.B." stands for the wheel brake being applied.

As shown in the table, when the accelerator pedal is depressed for acceleration, an optimum reduction ratio is selected for the transmission in consideration of the vehicle speed and the amount of operation on the accelerator pedal, so that both the vehicle speed and the engine speed increase.

With the accelerator pedal kept at a suitable position for driving by traction torque, the reduction ratio is not controlled but the vehicle speed and the engine speed are kept substantially constant.

With both the accelerator pedal and the brake pedal having been released for running by inertia, the reduction ratio of the transmission is so controlled as to prevent any countertorque from the driving wheels 3 from acting on the engine 2, so that the engine speed is reduced to the idling speed of rotation (for example, 700 rpm), and at the same time the vehicle speed gradually decreases due to the resistance of the road surface and other factors.

With the accelerator pedal having been released, when the brake pedal 6 is stepped on, the reduction ratio of the transmission is adjusted to increase in accordance with the amount L of operation on the brake pedal 6, so that the engine functions as a brake to reduce the vehicle speed. When the engine speed has reached a preset level (for example, 2500 rpm), further operation on the brake pedal 6 will cause the servoactuator 25 to push the piston rod 16a of the master cylinder 16 in the direction X, so that the wheel brake 7 begins to work. The effect of the wheel brake 7 is so adjusted that the engine speed S does not exceed the preset value Smax. In other words, when the engine speed has reached the preset value Smax due to engine brake, the wheel brake 7 cooperates with the engine brake thereby to effect rapid deceleration of the vehicle.

In a lower speed range where the reduction ratio is relatively high, if the brake pedal 6 is stepped on excessively, the engine brake is likely to work too much temporarily. In such a case the pressure of the oil in the pipe 13 increases so that the torque T detected by the torque detector 26 exceeds the allowable maximum value Tmax, whereupon the control amount corrector 33 operates to correct the command signal to be applied to the previously mentioned actuator 15 so as to reduce the reduction ratio thereby to offset the excessive amount of operation on the brake pedal and reduce the effect of the engine brake until the torque value T becomes substantially equal to the allowable maximum torque value Tmax.

In the control system described above, when the brake pedal is operated while the automobile is running at a high speed, both the wheel brake and engine brake cooperate to effect proper deceleration of the vehicle speed without causing the engine to overrun. On the other hand, when the brake pedal is operated while the automobile is running in the middle or low speed range, chiefly it is engine brake that causes deceleration of the vehicle. Therefore, in either case it is possible to make effective use of engine brake in accordance with the operation of the brake pedal thereby to relieve the wheel brakes of the burden.

With the control system of the invention, it is possible to determine the conditions for controlling the reduction ratio of the transmission while the brake pedal is released without taking engine brake into consideration, with resulting increase in freedom in determination of the conditions. Since the system of the invention enables running of the automobile by inertia without releasing the clutch, drivability is greatly improved.

Figure 6:
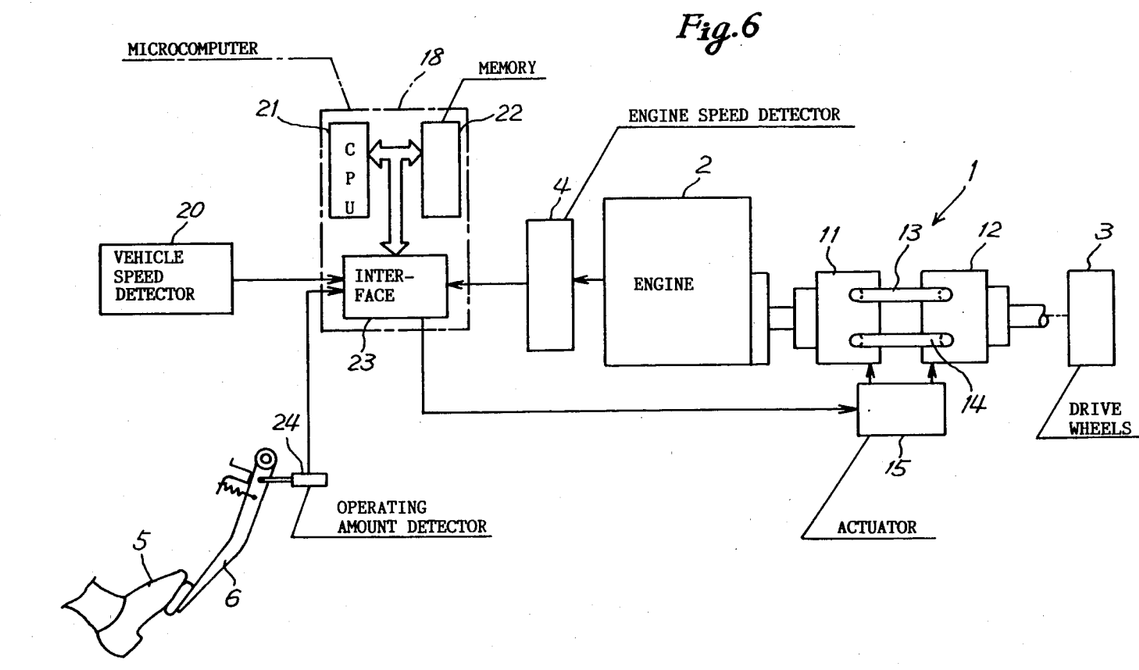
FIG. 6 is a schematic diagram showing in detail the embodiment of FIG. 3.

Another embodiment of the invention is shown in FIG. 6, wherein the same reference symbols as in FIG. 5 designates corresponding parts so that no explanation will be given to those parts except when necessary.

In the system of FIG. 6, the servoactuator 25 for operating the wheel brake 7 in the system of FIG. 5 is omitted, and the microcomputer 18 in FIG. 6 has a function as an engine speed setting device for setting an engine speed V for engine brake in accordance with the amount L of operation on the brake pedal 6 when the pedal has been stepped on and also a function as a reduction ratio adjuster for adjusting the reduction ratio of the transmission in such a manner that the engine speed S as detected by the engine speed detector 4 approaches or conforms to the above-mentioned engine speed V.

Figure 8:
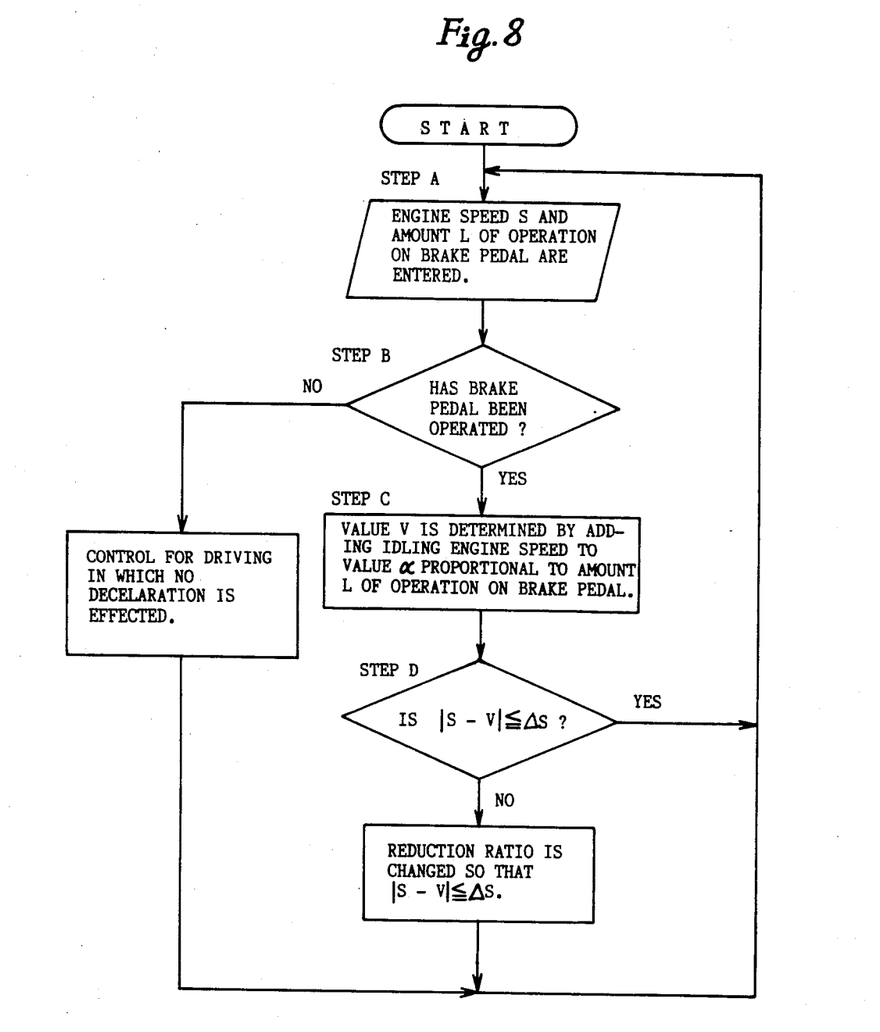
FIG. 8 is a flow chart showing the sequence of operations conducted in the system of FIG. 6.

FIG. 8 is a flow chart illustrating the sequence of operations conducted in the system of FIG. 6 in accordance with a program stored in the microcomputer 18.

First, at step A the engine speed S and the amount L of operation on the brake pedal are entered into the microcomputer. At step B whether or not the brake pedal 6 is stepped on is checked, and when it is confirmed that the brake pedal is stepped on, step C is taken, where the engine speed V for engine brake is determined by adding to the engine speed at idling (that is, the idling engine speed) a positive variable α proportional to the amount L of operation on the brake pedal 6. There may be provided a table of variables α previously determined in connection with the amounts of stepping operation on the brake pedal and vehicle speeds, so that they may be taken out when required. However, the above-mentioned method is easy to carry out.

Next, at step D whether the difference between the engine speeds S and V is below an allowable error ΔS or not is checked, and when the difference is below the error ΔS, the process returns to step A. Otherwise the process goes onto step E, where the microcomputer 18 produces a command signal to change the reduction ratio of the transmission so that the absolute value of the difference between the engine speeds S and V comes below the allowable error ΔS, and applies the command signal to the actuator 15.

At step B if it is determined that the brake pedal 6 has not been stepped on, the control operations for driving in which no deceleration is effected are performed.

With the arrangement of FIG. 6, the engine speed V for engine brake is determined in accordance with the degree of the operation of stepping on the brake pedal, and the reduction ratio of the transmission 1 is adjusted so that the actual engine speed S conforms to the engine speed V. This means that as strong engine brake as the brake pedal is stepped on is effected so that the vehicle can be decelerated substantially to a standstill by engine brake only.

In the embodiment of FIG. 6, the wheel brake controller is omitted. Needless to say, a system including a wheel brake controller is included in the scope of the invention.

In the illustrated embodiments the continuously variable transmission is shown as of a hydrostatic type. A hydromechanical type of transmission may also be used. In this case the transmission comprises a combination of a hydraulic pump/motor of a variable displacement type connectable to the output of the engine through a gear and clutch mechanism and a hydraulic pump/motor of a variable displacement type connectable to the drive wheels through the gear and clutch mechanism, with the inlet/outlet ports of one of the hydraulic pump/motors communicating with the inlet/outlet ports of the other of the hydraulic pump/motors.

Thus, with the arrangement of the invention, it is possible to cause engine brake to function effectively in accordance with the degree of stepping operation on the brake pedal thereby to lighten the burden on the wheel brakes and prevent various troubles such as lowering of the durability and production of heat.

In accordance with the invention, it is possible to determine various conditions for controlling the reduction ratio of the transmission while the brake is released without taking engine brake into consideration, with resulting increase in freedom in determination of controlling conditions. Since it is possible to run the automobile by inertia without releasing the clutch, drivability is greatly improved.

What I claim is:

1. A deceleration control system for an automobile provided with an engine, drive wheels, a braking system including a brake pedal and wheel brakes, and a continuously variable transmission interposed between said engine and said drive wheels, a reduction ratio of said transmission being continuously variable in accordance with an operating signal applied to an actuating terminal for controlling said reduction ratio, and said deceleration control system comprising:
an engine speed detector means for detecting a rotational speed of said engine;
means for detecting brake pedal movement during actuation thereof;
an engine brake controller means for producing an operating signal corresponding to said brake pedal movement by a driver and for applying said operating signal to said actuating terminal thereby to change said reduction ratio so as to provide engine braking commensurate with said ratio change;
a wheel brake controller means for augmenting said engine braking by operating said wheel brakes, only when the engine speed detected by said engine speed detector reaches a predetermined level, so that said engine speed will not exceed said predetermined level.

2. The system of claim 1, wherein said continuously variable transmission is of a hydrostatic type.

3. The system of claim 2, wherein said continuously variable transmission comprises a combination of a first hydraulic pump/motor of a variable displacement type connected to the output of said engine and a second hydraulic pump/motor of a variable displacement type connected to said drive wheels, with the inlet/outlet ports of said first hydraulic pump/motor communicating with the inlet/outlet ports of said second hydraulic pump/motor.

4. The system of claim 1, wherein said continuously variable transmission is of a hydromechanical type.

5. The system of claim 4, wherein said continuously variable transmission comprises a combination of a hydraulic pump/motor of a variable displacement type connectable to the output of said engine through a gear and clutch mechanism and a hydraulic pump/motor of a variable displacement type connectable to said drive wheels through said gear and clutch mechanism, with the inlet/outlet ports of one of said hydraulic pump/motors communicating with the inlet/outlet ports of the other of said hydraulic pump/motors.

6. A deceleration control system as in claim 1, and further comprising:
means for detecting an effect of said braking;
means for presetting a maximum value of braking effect;

means for correcting said operating signal when said detected braking effect exceeds said maximum value so as to lower said reduction ratio and said engine braking in order to reduce said braking effect below said maximum value.

7. A deceleration control system as in claim 6 wherein:
said braking effect detecting means comprises a torque detector; and
said braking effect comprises a countertorque exerted on said transmission by said drive wheels.

8. A deceleration control system as in claim 6 wherein:
said braking effect comprises locking of said wheels; and
said correcting means comprises means for unlocking said wheels.

9. A deceleration control system for an automobile provided with an engine, drive wheels, a braking system including a brake pedal and wheel brakes, and a continuously variable transmission interposed between said engine and said drive wheels, a reduction ratio of said transmission being continuously variable in accordance with an operating signal applied to an actuating terminal for controlling said reduction ratio, and
said deceleration control system comprising:
an engine speed detector means for detecting a rotational speed of said engine;
means for detecting brake pedal movement during actuation thereof;
means for determining a particular engine speed commensurate with a particular degree of said brake pedal actuation and sufficient to decelerate said automobile substantially to a standstill from said particular engine speed by engine braking only; and
means for adjusting said reduction ratio so as to adjust said engine speed generally to said particular engine speed according to said particular degree of brake pedal actuation and said determining.

10. The system of claim 9, wherein said continuously variable transmission is of a hydrostatic type.

11. The system of claim 10, wherein said continuously variable transmission comprises a combination of a first hydraulic pump/motor of a variable displacement type connected to the output of said engine and a second hydraulic pump/motor of a variable displacement type connected to said drive wheels, with the inlet/outlet ports of said first hydraulic pump/motor communicating with the inlet/outlet ports of said second hydraulic pump/motor.

12. The system of claim 9, wherein said continuously variable transmission is of a hyudromechanical type.

13. The system of claim 12, wherein said continuously variable transmission comprises a combination of a hydraulic pump/motor of a variable displacement type connectable to the output of said engine through a gear and clutch mechanism and a hydraulic pump/motor of a variable displacement type connectable to said drive wheels through said gear and clutch mechanism, with the inlet/outlet ports of one of said hydraulic pump/motors communicating with the inlet/outlet ports of the other of said hydraulic pump/motors.

* * * * *